United States Patent [19]

Zitzmann

[11] Patent Number: 4,546,826

[45] Date of Patent: Oct. 15, 1985

[54] SPIRAL HEAT EXCHANGER

[75] Inventor: Hubertus Zitzmann, Bretten, Fed. Rep. of Germany

[73] Assignee: W. Schmidt GmbH & Co. KG, Bretten, Fed. Rep. of Germany

[21] Appl. No.: 699,400

[22] Filed: Feb. 7, 1985

[30] Foreign Application Priority Data

Feb. 8, 1984 [DE] Fed. Rep. of Germany ....... 3404374

[51] Int. Cl.⁴ ............................................. F28D 9/04
[52] U.S. Cl. ...................................... 165/163; 165/164
[58] Field of Search ................ 165/163, 164, 165, 170

[56] References Cited

U.S. PATENT DOCUMENTS

| | | | |
|---|---|---|---|
| 2,129,300 | 9/1938 | Bichowsky | 165/163 |
| 2,131,265 | 9/1938 | Bichowsky | 165/165 |
| 2,136,153 | 11/1938 | Rosenblad | 165/165 |
| 2,360,739 | 10/1944 | Ström | 165/165 |
| 2,663,549 | 12/1953 | Otten | 165/164 X |
| 3,762,467 | 10/1973 | Poon et al. | 165/164 X |
| 3,921,713 | 11/1975 | Schnitzer et al. | 165/164 |

*Primary Examiner*—Sheldon J. Richter

*Attorney, Agent, or Firm*—Spencer & Frank

[57] ABSTRACT

A spiral heat exchanger includes a vessel, a plurality of concentric sheet metal spirals situated in the vessel and defining first and second spiral flow channels for respective first and second fluids for effecting a heat exchange therebetween; first and second closure plates extending perpendicularly to the vessel axis and covering the spirals at opposite spiral edges thereof; and mounting bars pressing the closure plates against axially opposite edges of the spirals. The first closure plate defines a first axially oriented opening and the second closure plate defines a second axially oriented opening providing, in the first flow channel, an inlet and an outlet for the first fluid. The vessel comprises a cylindrical vessel shell entirely surrounding the spirals. The first closure plate has a radially outer circumferential edge surrounded by the first axially oriented opening and the second closure plate has a radially inner circumferential edge surrounding the second axially oriented opening, whereby the first axially oriented opening communicates with a radially outer part and the second axially oriented opening communicates with a radially inner part of the first flow channel.

8 Claims, 3 Drawing Figures

SPIRAL HEAT EXCHANGER

BACKGROUND OF THE INVENTION

This invention relates to a spiral heat exchanger, particularly for fluids under high pressure and for use in chemical reactors. The heat exchanger is of the type which has sheet metal spirals which form at least two spiral flow channels for the fluids between which heat exchange is to take place. The spirals are arranged between two removable end plates which are pressed against the spirals by means of mounting bars and are provided with axially oriented inlet and outlet openings for one fluid, particularly the product fluid to be treated by the heat exchange, whereas the other fluid, such as a heating fluid or a refrigerant, is radially introduced into and removed from its spiral flow channel.

In spiral heat exchangers of the above-outlined type, particularly when used in reactors of chemical plants, one of the fluids flows through the spirals axially, while the other flows circumferentially therethrough. Guiding the fluids in such a "cross flow" has the disadvantage that the cross-sectional surface for the flow in the axial direction is disproportionately large as compared to the spiral flow and, as a result, the flow velocities of the axial fluid stream are very small, and consequently, the heat-transfer coefficient is low. Thus, even in case of a high heat-transfer coefficient on the other wall side, the overall heat transmission coefficient which is representative of the entire heat exchange is permanently reduced.

Apart from the above considerations, channelling the fluids in a cross flow is further undesirable for reasons of thermal technology, because significant differences in the temperature gradients of the two fluids appear.

It has been attempted to remedy the above disadvantages by arranging the heat exchanger externally of the chemical reactor and to circulate the product fluid by a circulating pump. Such a solution, however, involves significant expenses. Particularly in case the product is under a relatively high pressure of, for example, 30-40 bar, as it is the case in many hydrating reactions, the heat exchanger has to be of extremely stable construction to ensure the necessary pressure resistance.

SUMMARY OF THE INVENTION

It is accordingly an object of the invention to provide an improved spiral heat exchanger of the above-outlined type which is adapted to operate under very high pressures, which is structurally simple and inexpensive and which is further characterized by a favorable fluid guidance. It is a further object of the invention to ensure a ready accessibility for inspection and cleaning.

These objects and others to become apparent as the specification progresses, are accomplished by the invention, according to which, briefly stated, the cylindrical outer shell of the spirals is bent radially inwardly over the closure plates at both sides and forms a pressure resistant vessel which surrounds the heat exchanger on all sides, and further, the inlet and the outlet of one of the flow channels is formed by a radially inner clearance at one of the closure plates and by a radially outer clearance at the other closure plate.

The invention has the advantage that the closure plates on opposite sides of the head exchange spirals are no longer exposed to the absolute pressure of the fluids between which the heat exchange is to take place, as it has been the case in constructions known heretofore. Rather, the closure plates have to take up only the differential pressure between the inlet and the outlet of the flow. In practice, this pressure difference is one bar at the most and thus causes no difficulties. A buckling of the closure plates which is unavoidable in the conventional constructions because of the high compression stress and which leads to a short circuit in the flow and thus to a reduced heat exchange, is reliably avoided.

Since the closure plates and particularly their mounts need not be designed for high pressure stresses, they may be easily removable elements to thus provide a ready access for an external inspection and maintenance of the flow channels.

The closure plates according to the invention further provide for a more advantageous channelling (guidance) of the fluids. This is so because by virtue of the radial offsetting of the inlet and outlet openings, in the one and the other closure plate, the axially admitted fluid too, is constrained to flow circumferentially through the spirals with a correspondingly higher velocity, thereby ensuring a higher heat-transfer coefficient. Dependent upon the quantities of the product, one or more parallel-arranged flow channels may be provided by means of a corresponding number of sheet metal spirals.

The invention is thus based, on the one hand, on a separation of the sealing function and the pressure resistance by using different structural components therefor and, on the other hand, on a radial offsetting of the inlet and outlet openings in the closure plates, whereby a codirectional flow or, preferably, a counter flow of the fluids prevails as opposed to a conventional cross flow whose disadvantages have been discussed earlier. Further, the pressure resistant vessel which surrounds the heat exchanger may function as a reactor for certain chemical processes.

According to a further feature of the invention, the sheet metal spirals are welded to the cylindrical outer jacket (vessel shell) and a cylindrical inner shell solely at their radially outer and radially inner axial terminal edges, while otherwise they are only clamped axially to the two closure plates so that they may shift in the radial and circumferential directions. This arrangement ensures that despite the extraordinarily high temperature differences between the fluids no dangerous stresses may build up in the walls across which heat exchange takes place.

It is theoretically feasible to bound both flow channels of the heat exchanger in the axial direction by the closure plates engaging the spirals at opposite ends. In practice, however, it is advisable to provide such a separation of the flow channels that a hermetic seal therebetween is ensured in all circumstances. For this purpose, expediently, the sheet metal windings are welded to one another along one flow channel at their axial edges, with the interposition of a wire spiral which fills the clearance between the sheet metal spirals. Preferably, for this purpose that flow channel is used which handles the heating or cooling medium to ensure that the flow channel through which the product passes remains freely accessible and may thus be easily cleaned.

In order to ensure that at least one of the closure plates may be easily removed, according to a further feature of the invention, such closure plate is formed of circumferentially successive circular sectors which are, at their radially extending edges bent upwardly to form flanges which are connected by screws with mounting bars arranged in a spoke-like pattern. The mounting bars are, in turn, welded to the cylindrical outer or, respectively, inner jacket.

DESCRIPTION OF THE PREFERRED EMBODIMENT

Figure 1:
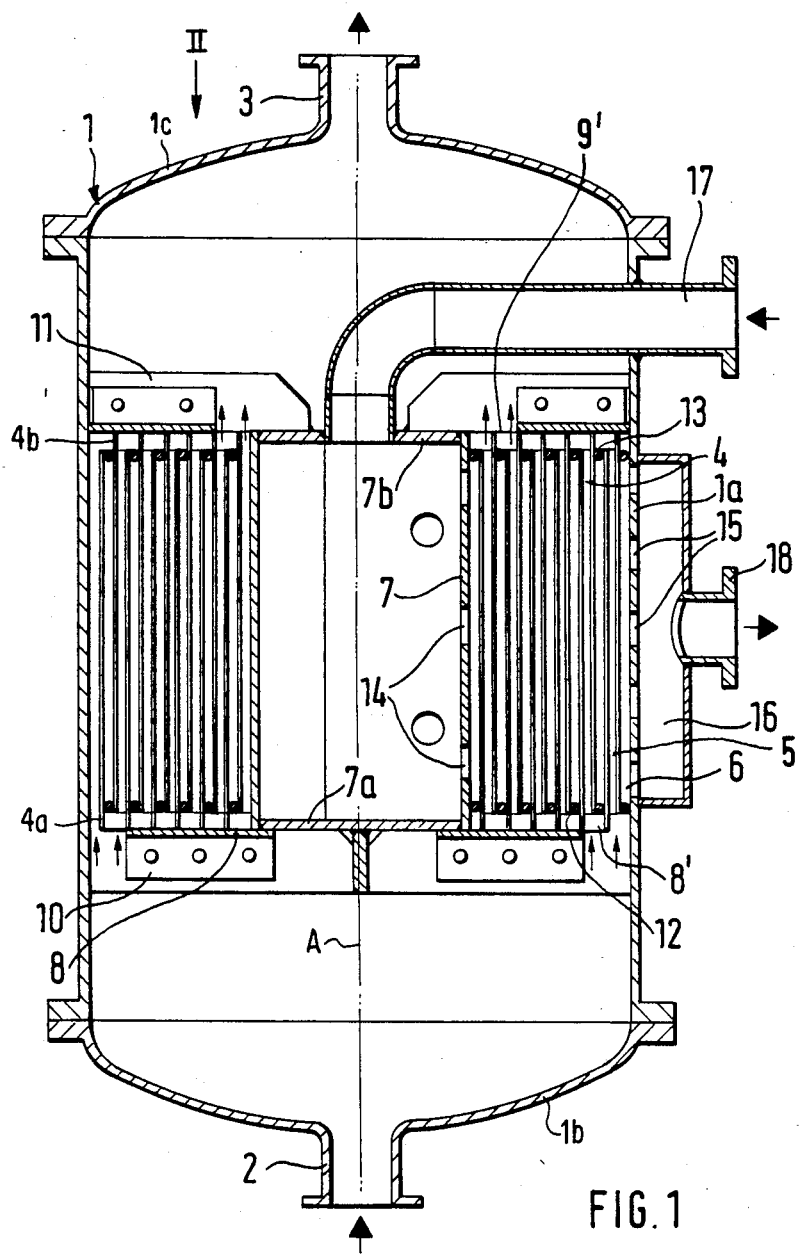
FIG. 1 is a schematic axial sectional view of a preferred embodiment of the invention.

Turning to FIG. 1, there is illustrated a pressure-tight cylindrical vessel 1 formed of a cylinder shell 1a, as well as top and bottom lids 1b and 1c. The lids 1b and 1c have, for the product fluid to be heated or cooled in the heat exchanger, an inlet nipple 2 and an outlet nipple 3, respectively. In the inside of the vessel 1 there is accommodated a spiral heat exchanger 4 formed of two sheet metal spirals 4a and 4b which are arranged coaxially with respect to the vessel axis A and which form two separate spiral flow channels 5 and 6. At the radially outer side, the heat exchanger 4 is closed by the cylindrical shell 1a of the vessel 1, whereas the radially inner side of the heat exchanger 4 is closed by an inner cylindrical shell 7 constituted by a tube closed at its opposite axial ends. Also referring to FIG. 2, the sheet metal spirals 4a and 4b are welded at their respective radially outer and radially inner ends to the outer cylinder 1a and the inner cylinder 7.

The spirals 4a and 4b are closed at opposite axial ends by a lower annular closure plate 8 and an upper annular closure plate 9.

Figure 2:
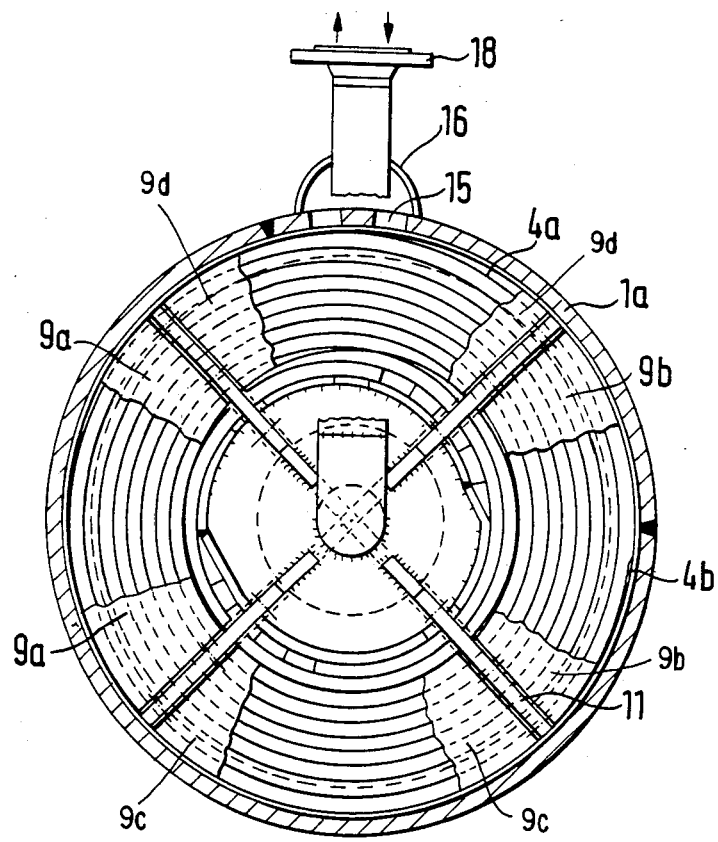
FIG. 2 is an end view of the preferred embodiment in the direction of the arrow II.
Figure 3:
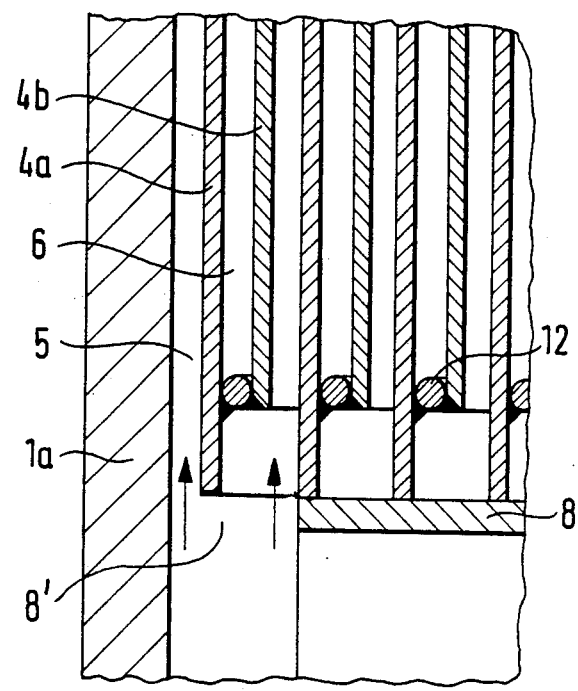
FIG. 3 is a fragmentary enlarged axial sectional view of a detail of FIG. 1.

Considering in particular FIG. 2, the closure plates 8 and 9 are formed of individual circular sectors, of which the sectors 9a, 9b, 9c and 9d of the upper closure plate 9 are visible. They lie with their outer edge against the cylindrical vessel shell 1a, while with their inner edge they engage the lower and, respectively, upper pipe end 7a and 7b of the shell 7. At their radially extending lateral edges the circular segments of the closure plates 8, 9 are bent rectangularly downwardly and, respectively, upwardly, whereby flanges are formed which are attached by screws to lower mounting bars 10 and upper mounting bars 11 extending adjacent the segments in a spoke-like configuration. The mounting bars 10, 11 are, at the inside, welded to the lower and, respectively, upper pipe closure 7a and 7b, and at the outside, are welded to the cylindrical vessel wall 1a. The mounting bars 10, 11 position the respective closure plates 8 and 9 against the spiral outer edges of the spirals 4a and 4b, respectively, without being bonded thereto.

By virtue of their segmented construction, the closure plates 8 or 9 may be removed in a simple manner, whereby the flow channels of the heat exchanger 4 may be inspected and/or cleaned. For this purpose, the vessel lids 1b and/or 1c are removable and/or the vessel 1 may be provided with a manhole.

Reverting once again to FIG. 1, the spirals 4a and 4b are axially slightly offset with respect to one another. Along circumferential, spirally extending edge portions the two spirals 4a and 4b are welded to one another with the interposition of a lower wire spiral 12 and an upper wire spiral 13 for forming the axially hermetically closed flow channel 6. The flow channel 6 which is intended for guiding the heating or cooling fluid therein, is, at its radially inner end, communicating by means of transverse ports 14 with the inner space of the inner cylindrical shell 7 and is, at its radially outer end, communicating with a collector 16 by transverse ports 15 provided in the vessel wall 1a. The shell 7 is joined at the top by a supply conduit 17 which traverses the vessel 1. An outlet conduit 18 communicates with the collector 16. By means of this arrangement the heating or cooling fluid flows in the flow channel 6 from the inside helically outwardly through the heat exchanger 4.

The product fluid is introduced into the heat exchanger 4 axially through the inlet opening 2. The outer periphery of the lower closure plate 8 defines, with the wall 1a, an annular clearance 8' which constitutes the sole entrance of the product fluid into the heat exchanger 4. Thus, the product may enter the heat exchanger 4 only at the two external turns of the flow channel 5. At the opposite axial end of the heat exchanger 4, the inner periphery of the closure plate 9 defines, with the wall of the tube 7, an annular clearance 9' which constitutes the sole outlet for the product fluid. Thus, the product, despite its axial introduction and removal, has to flow in a spiral (circumferential) path through the heat exchanger 4. Thus, the product flows in a counter current to the heating or cooling fluid introduced by the conduit 17, so that optimal heat exchange conditions will prevail.

In FIG. 1, the number of windings is significantly reduced for clarity. In practice, for the shown dimensions there are approximately twenty turns. If then two turns each are utilized for the inlet (8') and the outlet (9'), there is obtained a counter flow in sixteen turns, thus, for 80% of the heat exchange surface.

It will be understood that the above description of the present invention is susceptible to various modifications, changes and adaptations, and the same are intended to be comprehended within the meaning and range of equivalents of the appended claims.

What is claimed is:

1. In a spiral heat exchanger including a vessel, a plurality of concentric sheet metal spirals situated in said vessel and having a longitudinal axis and defining first and second spiral flow channels for respective first and second fluids for effecting a heat exchange therebetween; first and second closure plates extending perpendicularly to said axis and covering said spirals at opposite spiral edges thereof; mounting bars pressing the closure plates against axially opposite edges of said spirals; said first closure plate defining a first axially oriented opening and said second closure plate defining a second axially oriented opening providing, in said first flow channel, an inlet and an outlet for said first fluid; means defining a radially oriented inlet and a radially oriented outlet in said second flow channel for said second fluid; the improvement wherein said vessel comprises a cylindrical vessel shell entirely surrounding said spirals and further wherein said first closure plate has a radially outer circumferential edge surrounded by said first axially oriented opening and said second closure plate has a radially inner circumferential edge surrounding said second axially oriented opening, whereby said first axially oriented opening communicates with a radially outer part and said second axially oriented opening communicates with a radially inner part of said first flow channel.

2. A spiral heat exchanger as defined in claim 1, wherein said cylindrical shell is drawn radially inwardly beyond said first and second closure plates.

3. A spiral heat exchanger as defined in claim 1, wherein each said spiral has generally axially extending radially inner and radially outer edges; further comprising a cylindrical inner shell surrounded by said spirals; said radially outer edge of each said spiral being bonded to said cylindrical vessel shell and said radially inner edge of each said spiral being bonded to said cylindrical inner shell; and further wherein said closure plates engage said spirals without being bonded thereto.

4. A spiral heat exchanger as defined in claim 1, wherein adjoining spiral edges of said spirals are bonded to one another at axially opposite sides of said spirals for axially closing one of said flow channels.

5. A spiral heat exchanger as defined in claim 4, further comprising respective wire spirals extending between the sheet metal spirals at axially opposite sides thereof; said adjoining spiral edges being bonded to one another by means of said wire spirals.

6. A spiral heat exchanger as defined in claim 1, wherein at least one of said closure plates is formed of a plurality of circular sectors.

7. A spiral heat exchanger as defined in claim 6, wherein said mounting bars are arranged in a spoke-like pattern; each said circular sector having radially extending, upstanding flanges oriented away from said spirals and secured to respective said mounting bars.

8. A spiral heat exchanger as defined in claim 7, further comprising a cylindrical inner shell surrounded by said spirals; said mounting bars being affixed, at respective opposite ends thereof, to said cylindrical vessel shell and said cylindrical inner shell.

* * * * *